United States Patent [19]
Girardier et al.

[11] 3,877,232
[45] Apr. 15, 1975

[54] PISTON ENGINE UTILIZING A LIQUEFIABLE GASEOUS FLUID

[75] Inventors: Jean-Pierre Girardier, Paucourt; Philippe Parquet, Montargis, both of France

[73] Assignee: Sofretes-Societe Francaise d'Etudes Thermiques et d'Energie Solaire, Amilly, Loiret, France

[22] Filed: May 31, 1974

[21] Appl. No.: 475,257

[30] Foreign Application Priority Data
June 19, 1973 France.................. 73.22276

[52] U.S. Cl............... 60/657; 60/671; 60/690
[51] Int. Cl................ F01k 11/00; F01k 25/06
[58] Field of Search............ 60/646, 651, 657, 671, 60/690

[56] References Cited
UNITED STATES PATENTS

| | | | |
|---|---|---|---|
| 2,642,722 | 5/1949 | Vaughn................ | 60/646 |
| 3,292,366 | 12/1966 | Rice et al.............. | 60/651 |
| 3,462,951 | 8/1969 | Moore.................. | 60/657 |
| 3,603,087 | 9/1971 | Burkland.............. | 60/671 |
| 3,797,248 | 3/1974 | Witzel et al........... | 60/646 |

*Primary Examiner*—Martin P. Schwadron
*Assistant Examiner*—Allen M. Ostrager
*Attorney, Agent, or Firm*—Young & Thompson

[57] ABSTRACT

In a piston engine which is actuated by expansion of a fluid vaporized under pressure and having lubricating properties in the liquid state, a cylinder is provided with a high-pressure fluid inlet which can be closed-off by means of a cyclic mechanism operated by the crankshaft. A zone of lubrication of the cylinder and of the cyclic mechanism is provided with a passage combined with cooling means for causing condensation of the fluid within the passage.

23 Claims, 6 Drawing Figures

PISTON ENGINE UTILIZING A LIQUEFIABLE GASEOUS FLUID

The present invention relates to a piston engine which utilizes a liquefiable gaseous fluid having lubricating properties in the liquid state.

This invention is more particularly directed to an engine actuated by the expansion of a vaporized fluid under pressure within a system which operates with a low temperature difference.

Engines of the class mentioned above are already known, especially of the type associated with a hot source in which a solar or geothermal heat collector is employed. By way of example, these engines comprise a piston slidably mounted within a cylinder in which a work chamber is formed and a crankshaft associated with the piston and rotatably mounted within a casing which is rigidly fixed to the cylinder. Obturatable ports controlled by a cyclic mechanism in dependence on the rotation of the crankshaft open into the work chamber, the intended function of said ports being to ensure that the admission of high-pressure driving fluid and the discharge of this latter take place at the proper moments.

These engines are employed mainly in areas which are not equipped with technical facilities. They are intended to operate practically without supervision for a number of years. It has in fact been proved by experience that the endurance of these engines is adversely affected by faulty lubrication arising from the fact that the lubricant is carried away by the driving fluid or that in other instances, the driving fluid tends to accumulate within the casing. These disadvantages become more serious if it is endeavored to increase the running speed and the power of the engine.

With a view to finding a remedy for these disadvantages as applicable to the fluid circuits and devices which are external to the engine, the present Applicant has constructed a special driving system based in particular on the use of a fluid which has lubricating properties in the liquid state. This driving system together with its various fluid-circuits is described in French Pat. Application No. 73,21679 of June 14th, 1973 in the name of the present Applicant.

The aim of the invention is to provide a remedy more especially for the above-mentioned fault conditions insofar as they are liable to affect the engine and thus to permit the design of an engine which has considerable endurance and a power rating which is substantially higher than that of known engines. The engine under consideration can also be specially arranged to derive benefit from the advantages of the driving system mentioned in the foregoing.

In accordance with the invention, the piston engine which utilizes a liquefiable gaseous fluid having lubricating properties in the liquid state and especially an engine actuated as a result of the expansion of a fluid vaporized under pressure within a system which operates with a low temperature difference, and which comprises at least one piston slidably mounted within a cylinder in which is formed a work chamber and a crankshaft associated with the piston by means of a connecting-rod and rotatably mounted within a casing rigidly fixed to the cylinder, said cylinder being provided at least for the passage of the high-pressure fluid with an inlet which can be closed-off by means of a cyclic mechanism controlled by the rotation of the crankshaft, is characterized in that provision is made at least within one of the zones of lubrication of the cylinder and of the cyclic mechanism for a fluid passage and cooling means combined with said passage so as to cause condensation of the fluid therein.

The condensation of the fluid which is thus produced within a lubrication zone ensures continuous maintenance of a liquid film having lubricating properties since the fluid has been chosen for this purpose. A remedy is thus provided for imperfections of lubrication which affect engines of known types.

In one advantageous embodiment of the invention, the means for cooling the lubrication zone of the cylinder comprise fins which project from the external surface of the cylinder and extend substantially over the lubrication zone; the mechanism for clsoing-off the high-pressure fluid inlet comprises a rod mounted with a predetermined clearance within two supports extending in leak-tight manner through the wall of the work chamber and the wall of the casing; said two supports are connected to each other by means of a leak-tight jacket which surrounds the rod; the supports and the rod are made of material having a high coefficient of thermal conductivity.

The arrangements which have just been indicated make it possible to carry out the lubrication of two critical zones in an efficient manner.

In a preferred embodiment of the invention, the engine as specified in the foregoing further comprises a piston provided with an inlet which can be closed-off by means of a cyclic mechanism controlled by the motion of the connecting-rod with respect to the piston; the piston has a necked portion forming a junction between two enlarged end portions which are coaxial with the cylinder and adjusted in relation to this latter in leak-tight manner; the obturatable inlet of the piston opens into the work chamber and can also communicate with an intermediate chamber constituted by the space provided between the necked portion of the piston and the adjacent wall of the cylinder in which is formed an opening for the passage of the low-pressure fluid.

The lubrication of the zone of sliding of the piston within the cylinder is thus improved by virtue of the complementary condensation of the fluid which flows within the piston. Lubrication of the piston inlet closure mechanism is effected at the same time with a view to ensuring long endurance of said mechanism.

Further properties and advantages of the invention will become apparent from the description of a preferred embodiment which is given hereinafter by way of example but not in any limiting sense, reference being made to the accompanying drawings, wherein.

Figure 1:
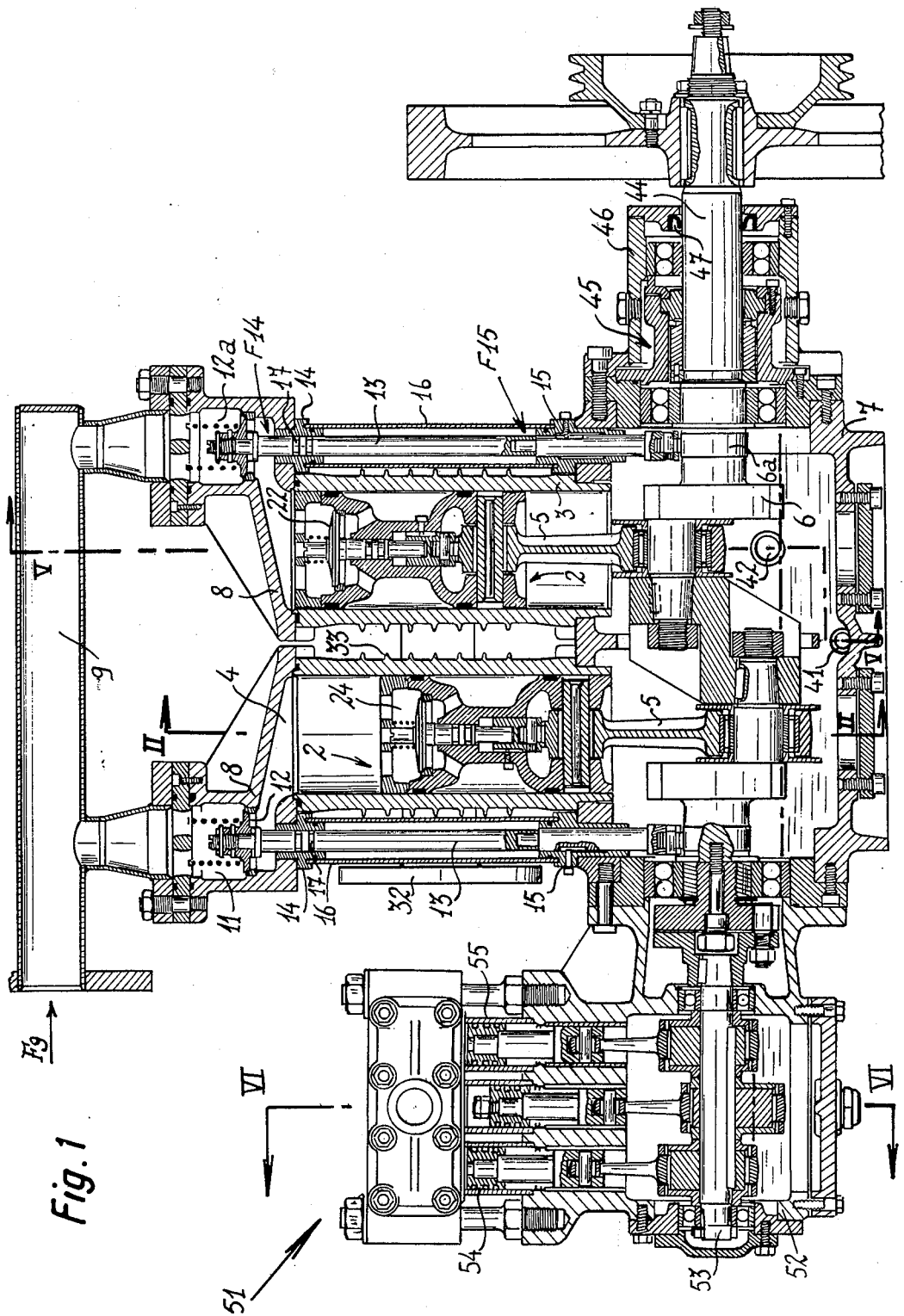
FIG. 1 is a longitudinal sectional view of the complete assembly of an engine in accordance with the invention.
Figure 3:
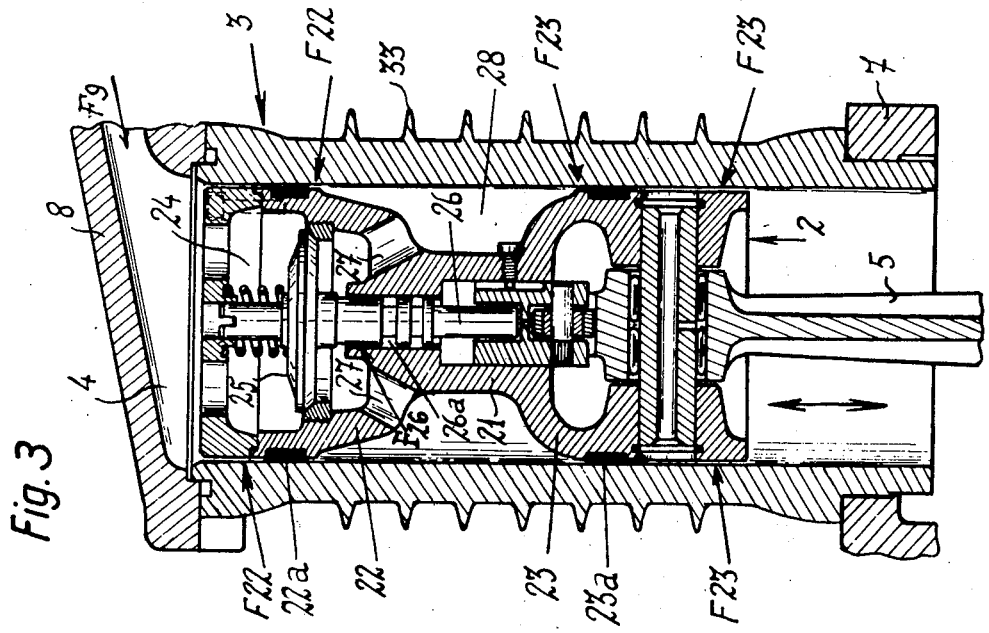
FIG. 3 is an enlarged sectional view of a cylinder of FIG. 1.

In the embodiment which is illustrated by way of example in FIGS. 1 to 6, the piston engine 1 is intended to be actuated by a fluid which is vaporized under pressure (FIG. 5) within a drive system designed to operate with a small temperature difference in accordance with the cited French patent application which purposes the use of a liquefiable gaseous fluid having lubricating properties in the liquid state such as butane.

It is pointed out that the term "butane" is intended to refer in this description not only to this hydrocarbon in the pure state but also to similar mixtures which are usually delivered by industrial manufactures under this commercial designation.

The engine 1 has two pistons each slidably mounted within a cylinder 3 in which is formed a work chamber 4. By means of a connecting-rod 5, each piston 2 is associated with a crank-shaft 6 which is rotatably mounted within a casing 7. Said crank-shaft casing is joined to the cylinders 3 by means of tie-bolts (not shown in the drawings) which also connect cylinder heads 8 to the crank-shaft casing, said cylinder heads being intended to cover the cylinders 5 in fluid-tight manner.

The high-pressure fluid is supplied to the engine 1 in the direction of the arrow F9 through an inlet manifold 9 which is connected to each cylinder head 8 by means of an inlet 11 which can be closed-off by means of a cyclic mechanism controlled by the rotation of the crank-shaft 6 and adapted to actuate inlet valves 12. Said valves are each mounted on a valve-rod 13 secured to a roller which is applied against a cam 6a of the crank-shaft 6 by a helical spring 12a which urges the valve 12 in the direction of closure.

In accordance with the invention, the engine 1 is provided in the lubrication zone of each cylinder 3 and if each valve-rod 13 with passages for the fluid and cooling means combined with said passages for causing the condensation of the fluid within these latter.

The valve-rod 13 of each cylinder 3 traverses the wall of the cylinder head 8 in which is formed the work chamber 4 through a support consisting of a tubular guide 14 mounted on the cylinder head 8 in leak-tight manner. The valve-rod 13 also traverses the wall of the crankshaft casing 7 through another tubular guide 15 which is secured to said casing in leak-tight manner. The two guides 14, 15 are coaxial and joined to each other by means of a leak-tight tubular jacket 16 which surrounds the valve-rod 13. Annular seals of synthetic rubber ensure leak-tightness.

A passage as indicated by the arrows F14 and F15 (FIG. 4) is formed between the valve-rod 13 and each tubular guide 14, 15 for the high-pressure fluid which is thus capable of flowing along the valve-rod 13 from the work chamber 4.

As will become apparent hereinafter, the cooling means combined with the passages F14, F15 aforesaid are primarily based on the fact that the tubular guides 14, 15 as well as the leak-tight jacket 16 are of bronze. The good thermal conductivity of these three components improves the desired condensation effect to an appreciable extent.

At the level of the tubular guide 14, the ground-steel valve-rod 13 is provided with annular grooves 17 for the purpose of retaining a certain quantity of condensed fluid. Similarly, an annular chamber 18 is formed within the bore of the tubular guide 15 opposite to the valve-rod 13 in order that a certain quantity of condensed fluid may also be retained within this lubrication zone.

The piston 2 has a necked portion 21 (FIG. 3) forming a junction between two opposite enlarged end portions 22, 23 which are coaxial with the cylinder and adjusted within this latter so as to leave a small radial clearance as indicated by the arrows F22, F23. There is fitted around each end portion 22, 23 a sealing ring 22a, 23a, for example of PTFE filled with glass fibers, hard and greasy plastic material which is chosen for its properties of creep resistance. In order to prevent deformations caused by frictional contact with the cylinder wall over a long period of time, the sealing rings 22a, 23a each have a rectangular cross-section which is elongated in the direction of travel of the piston. The length of this rectangular profile is at least four times the thickness of the sealing ring. The cylinder 3 is internally ground and formed of cast-iron. The wall which is in contact with the sealing rings 22a, 23a has a mirrorlike finish. The piston is of lead bronze, this material being chosen for its excellent sliding properties.

At the end nearest the work chamber 4, the end portion 22 of the piston 2 has an outlet aperture 24 through which the fluid is discharged into the work chamber after expansion. The outlet aperture 24 can be closed-off by means of an exhaust valve 25 actuated by a reciprocating mechanism which is controlled by the movement of the connecting-rod 5 with respect to the piston 2. Said mechanism comprises on the end of the connecting-rod 5 a cam which produces action on a roller carried by the stem 26. The exhaust valve 25 is urged in the direction of closure by a helical spring which accordingly maintains the roller of the stem 26 applied against the cam.

The stem 26 is mounted within an axial bore of the piston with a predetermined clearance indicated by the arrow F26 (FIG. 3) so as to cause the fluid to pass between the stem 26 and the piston.

The cooling means combined with the passage aforesaid are rendered operative especially by virtue of the fact that, as has already been noted, the piston 2 is made of a copper alloy which has a high coefficient of thermal conductivity.

The portion of the stem 26 which slides within the piston is provided with annular grooves 26a for the purpose of retaining therein a certain quantity of condensed driving fluid.

As a result of the lift or upward travel of the exhaust valve 25, the outlet aperture 24 of the piston is put into communication with a series of exhaust ports 27 which open into an intermediate chamber 28 constituted by the space formed between the necked portion 21 of the piston 2 and the adjacent wall of the cylinder 3. There is formed in said wall an exhaust aperture 31 which is connected to an exhaust manifold 32. The location of the exhaust aperture 31 is chosen so as to ensure that said aperture remains freely and continuously in communication with the intermediate chamber 28 during the reciprocating movement of the piston 2, thus preventing any liquid block.

Cooling of the wall of the cylinder 3 in the lubrication zone of said wall which is swept by the motion of the piston 2 is ensured by means of fins 33 which project from the external surface of the cylinder and extend substantially over the lubrication zone. The effect obtained by making use of said cooling fins 33 in conjunction with the means aforesaid will be explained hereinafter.

The casing 7 of the engine 1 is of the sealed type comprising a filler inlet 7a fitted with a screwed-in filler plug. In accordance with the patent Application cited earlier, the engine casing 7 contains an oil which is miscible with the driving fluid and serves as lubricant.

The engine 1 is preferably designed to be employed (FIG. 5) in a driving system in which provision is made on the same side as the high-pressure fluid-circuits for an evaporator E associated with a hot source such as a solar radiation collector panel PS, a supply line L1 for feeding vaporized fluid to the engine 1 and a separator 8 mounted in the line L1 for the purpose of collecting the liquid elements which are entrained by the vaporized fluid.

In accordance with the invention, the casing 7 of the engine 1 has an inlet 41 which can be put into communication with the separator 8 by means of a line S1 in order to convey to the casing the liquid elements which are collected by the separator S.

On the side corresponding to the low-pressure fluid-circuits, the driving system comprises a condenser C associated with a cold source F and connected by means of a line L2 to the exhaust manifold 32 of the engine 1.

In accordance with the invention, the casing 7 has an overflow orifice 42 which can be put into communication with the condenser C by means of a line C1. The height of the orifice 42 within the casing 7 is chosen so as to define within this latter the upper limit of the level of liquid. This limit preferably corresponds to the lower portion of the ball-bearings of the crank-shaft 6 in the casing 7.

The crank-shaft 6 has an end portion 44 constituting a driving-shaft which traverses the wall of the sealed casing 7 through a fluid-tight rotary seal 45 consisting, for example, of a rotating graphite ring mounted on a leak-tight sleeve secured to the shaft and applied in an oil bath against an annular cheek of hard metal which is held in position elastically and in leak-tight manner on the exit side.

In accordance with the invention, the fluid-tight rotary seal aforesaid is covered by a leak-tight shell 46 which is secured to the casing 7 and fitted with a second fluid-tight rotary seal 47 which is mounted on the driving shaft 44 at the end remote from the casing 7 with respect to the first rotary seal 45. The fluid-tight rotary seal 47 is constituted for example by a ring of elastic material having a U-section profile, the two flanges of which closely conform to the shape of parallel cylindrical bearing surfaces of the driving-shaft 44 and of a circular orifice of the leak-tight shell 46, said orifice being traversed by the shaft 44. A spring of circular shape (not shown in the drawings) housed within the hollow portion of the U-section profile of the seal 47 applies the two flanges in leak-tight manner against the cylindrical bearing surfaces aforesaid. The flange which is applied on the side nearest the leak-tight shell 46 is maintained stationary against rotational motion. The surface of the shaft 44 which bears on the seal 47 is ground. The U-section arms of the seal 47 are mounted so as to be directed towards the interior of the shell 46, with the result that the internal pressure has the effect of forcibly applying the seal against its two bearing surfaces in the orifice of the shell 46 and the shaft 44.

Figure 5:
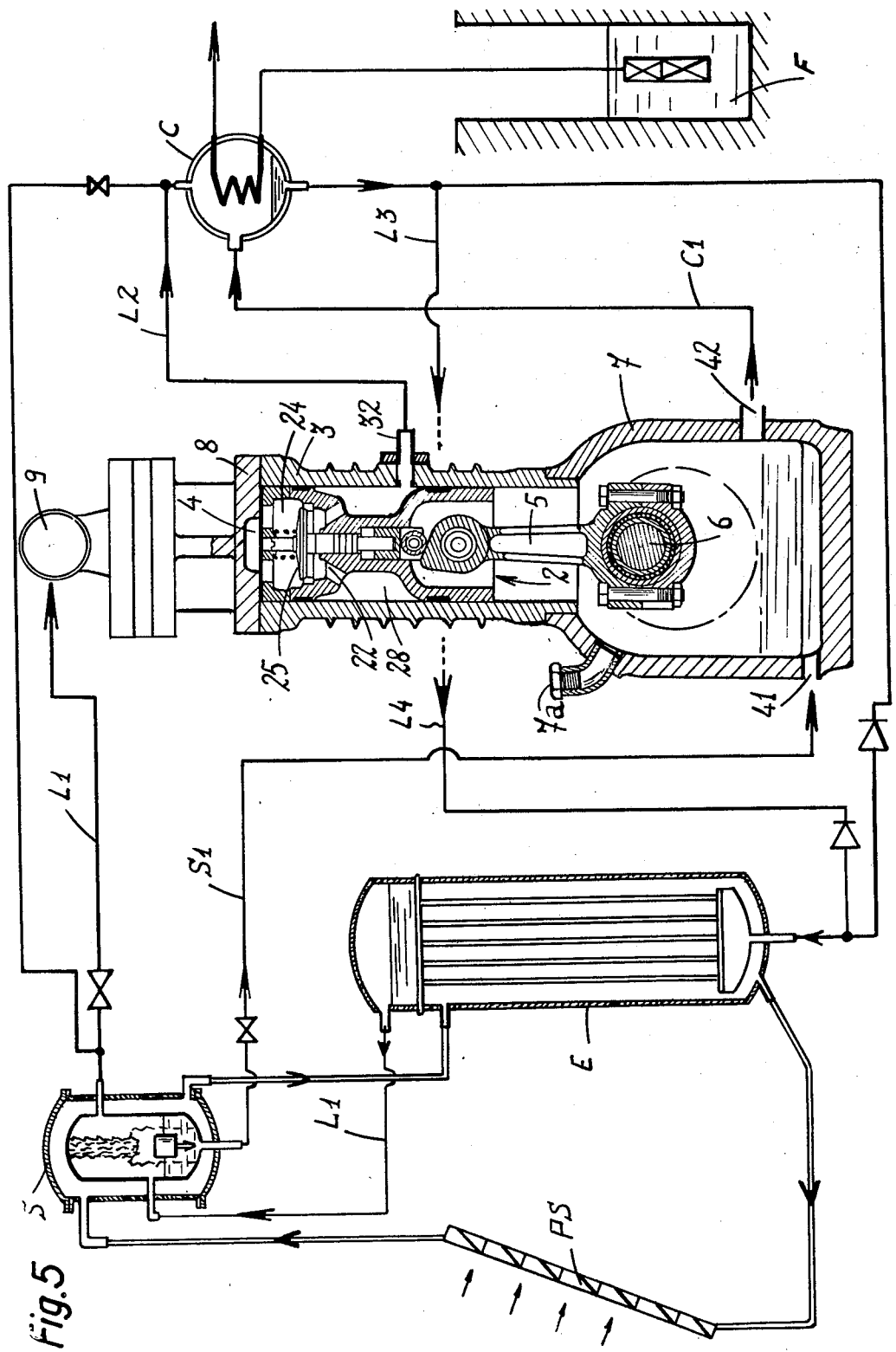
FIG. 5 is a general diagram of a drive system comprising the engine of FIG. 1 as shown in a sectional view which is similar to FIG. 2.
Figure 6:
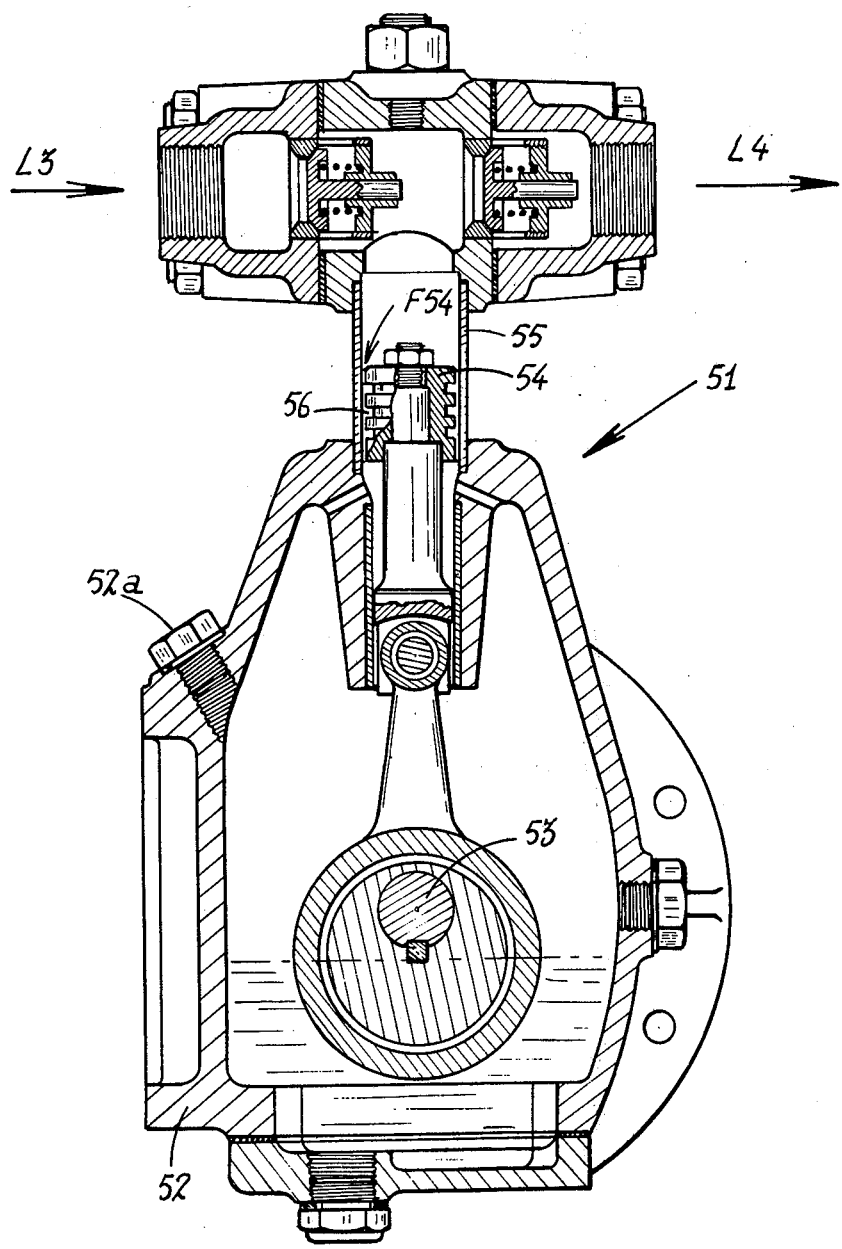
FIG. 6 is a diagrammatic view of the integrated reinjection pump of the engine shown in FIG. 1, this view being taken in cross-section along line V1—V1 of FIG. 1.

In the drive system shown in FIGS. 5 and 6, the engine 1 constitutes a mechanical assembly with a re-injection pump 51 which carries out within the evaporator E the introduction of the condensed fluid derived from the condenser C by means of the lines L3 and L4.

In accordance with the invention (as shown in FIGS. 1 and 6), the integrated re-injection pump 51 has a casing 52 which is impervious to the surrounding atmosphere, provision being made in said casing for a filler inlet 52a fitted with a screwed-in plug and adapted to communicate with the casing 7 of the engine 1 by means of the passages existing in the opposite ball-bearings of the shaft 53 of the pump 51 and of the crank shaft 6.

The integrated re-injection pump 51 comprises three bronze pistons 54 which are adjusted with a small radial clearance F54 (FIG. 6) within their bronze cylinders 55 and have annular grooves 56 for retaining the condensed fluid.

In accordance with the preferred embodiment which has just been described (FIG. 1), the present Applicant has constructed an engine 1 comprising two cylinders 3 which have a bore of 95 mm and a total cylinder capacity of approximately 1,000 cm³ whilst the pistons 2 have a stroke of 70 mm.

The sealing rings 22a, 23a of the pistons 2 (FIG. 3) had a thickness of 2 mm and a width of 25 mm. The radial clearance F22, F23 between the piston and the cylinder 3 was within the range of 0.05 to 0.08 mm.

The rods 13 which serve to operate the valves 12 (FIGS. 1 and 4) were constructed in two parts approximately 17 mm in diameter with a radial clearance F14, F15 of approximately 0.02 mm within the tubular guides 14, 15.

The integrated re-injection pump 51 (FIGS. 1 and 6) had a cylinder capacity of 80 cm³ corresponding to a bore of 34 mm and a stroke of 30 mm of the three pistons 54 which had a radial clearance of the order of 0.01 mm within their cylinders. The sliding surfaces were carefully polished.

The particular features of operation of the mechanical assembly in accordance with the invention as constituted by the engine 1 and the integrated re-injection pump 51 are explained in the following description.

In accordance with the patent Application cited in the foregoing, the driving fluid is preferably butane which has good lubricating properties in the liquid state. For the lubrication of the casing 7, an oil which is miscible with butane is employed. This oil has a kinematic viscosity of the order of 1,000 to 2,000 centistokes at a temperature of 20°C, 300 to 400 centistokes at 40°C and 40 to 60 centistokes at 80°C.

Figure 2:
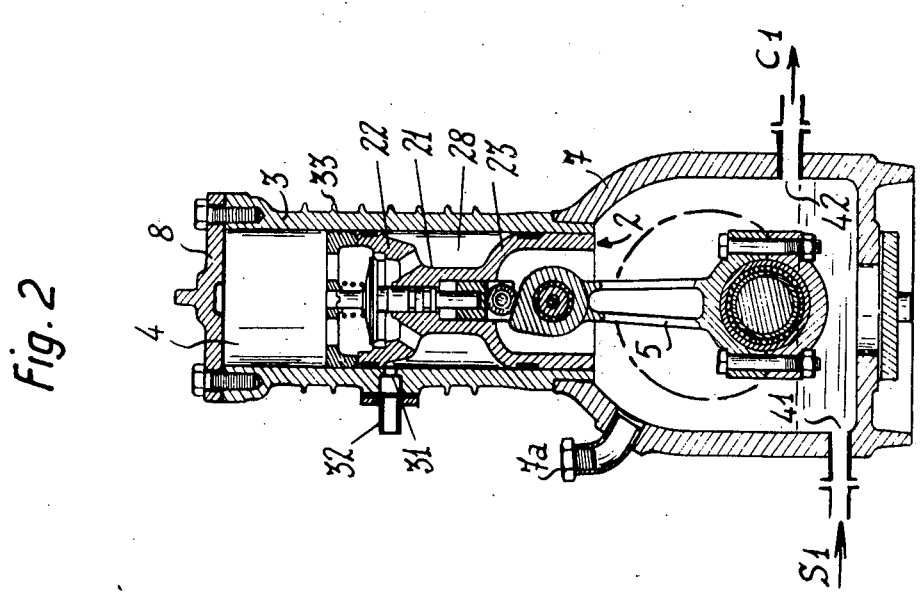
FIG. 2 is a transverse sectional view of the engine shown in FIG. 1, this view being taken along line II—II of this figure.
Figure 4:
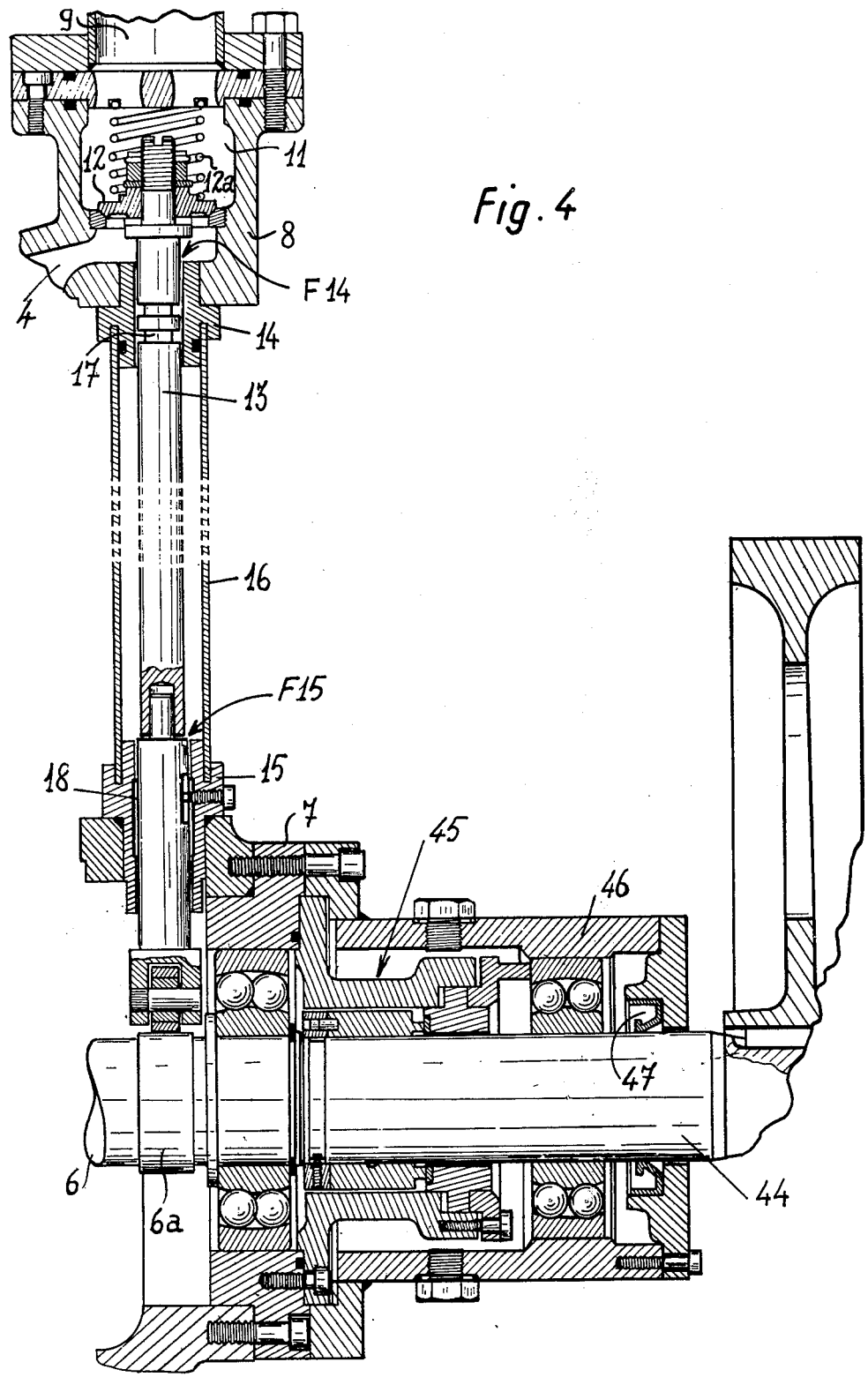
FIG. 4 illustrates an enlarged portion of FIG. 1, showing the mechanism of the inlet valve and the fluid-tight seal at the driving-shaft exit.

Before starting-up the drive system (FIG. 5), the sealed casing 7 is filled up to the level of the overflow orifice 42 with the above-mentioned oil which is introduced through the filler inlet 7a (FIG. 2). Similarly, the casing 52 of the integrated re-injection pump 51 is filled with oil through the filler inlet 52a (FIG. 6) up to the required level. The evaporator E is filled with butane under pressure in the liquid state. Heating of the evaporator E is put into operation and maintained by the hot source PS and cooling of the condenser C is initiated and maintained by means of the cold source F.

The vaporized butane under pressure in supplied through the line L1 to the inlet manifold 9 of the engine 1. The butane expands within the engine and ensures operation of this latter in a known manner while driving the integrated re-injection pump 51 (FIGS. 1 and 6). A given power output is available at the driving-shaft 44 for various purposes.

By virtue of the radial clearances F14, F15 of the rod 13 of the inlet valve 12 (FIGS. 1 and 4), the fluid supplied from the work chamber 4 penetrates between the valve-rod 13 and the tubular guides 14 and 15. The effect of expansion of the fluid which is wiredrawn within the passages F14, F15 causes intense cooling which results in condensation of the fluid and is transmitted to the tubular guides 14, 15 and to the valve-rod 13. The condensed fluid is collected within the grooves 17 and within the annular chamber 18 which maintain a film of condensed fluid on the two lubrication zones of the valve-rod 13.

The condensation phenomenon mentioned above is increased and made highly uniform by virtue of the fact that the tubular guides 14, 15 and the leak-tight jacket 16 are of bronze and have good conductivity and an appreciable thermal mass. Streaming of the condensed fluid then ensures lubrication of the roller which is associated with 6a cam 6a of the crank-shaft 6 and also contributes to the lubrication of the main bearing of the crank-shaft 6 in the casing 7, especially in the event of falling of the oil level.

The level of liquid within the casing 7 is limited by the overflow orifice 42 through which the excess volume is discharged to the condenser C via the line C1 as a result of an overpressure effect. The miscibility of the fluid and the oil selected makes it possible for these latter to be present together within the casing in which the condensed fluid takes part in the lubrication process since it has also been chosen for this purpose.

Lubrication of the internal wall of the cylinder 3 (FIG. 3) and the piston-rings 22a, 23a is carried out by virtue of the expansion of the driving fluid within the exhaust ports 27 which are associated with the exhaust valve 25 of the piston 2. In fact, this expansion causes condensation of the driving fluid and maintains cooling of the piston 2 of bronze which has good thermal conductivity. The fluid condensed in the form of dew-drops on the piston walls which limit the intermediate chamber 28 accumulates within the annular spaces corresponding to the radial clearances F22, F23 of the enlarged end portions of the piston and ensures lubrication of the wall of the cylinder 3 which is in contact with the piston-rings 22a, 23a.

The external fins 33 of the cylinder 3 (FIG. 3) play a contributory part in cooling the internal wall of the cylinder in which the expanded driving fluid which has been cooled and condensed in the form of dew-drops maintains a lubricating film as the sealing rings of the piston 2 pass along the cylinder wall.

The radial clearance F26 and the retaining grooves 26a formed in the stem 26 of the exhaust valve also perform a function of expansion, cooling, condensation and retention of the driving fluid. The rate of flow is regulated by the radial clearance F26 in order to maintain the lubrication of the stem 26, of the associated roller and portion of this latter which bears on the control cam as well as the lubrication of the needle-bearing of the small end of the connecting-rod 5 on the axis of the piston 2.

The flow of condensed fluid then passes along the connecting-rod 5 and takes part in the lubrication of the needle-bearing of the big end of the connecting-rod on the crankshaft 6, especially if the level within the casing subsequently drops. The flow of fluid terminates in the casing 7, the overflow orifice 42 of which maintains the level below a suitable limit irrespective of the running speed of the engine.

The lubrication of the integrated re-injection pump 51 (FIGS. 1 and 6) is ensured substantially as stated earlier by means of the radial clearance F54 of the pistons 54 within their cylinders and by reason of the fact that both the cylinders 55 and the pistons 54 are of bronze, said pistons being provided with retaining grooves 56 for the condensed fluid.

Streaming or running-down of condensed fluid ensures lubrication of the connecting-rods associated with the pistons 54 and of the eccentric bearings mounted on the shaft 53 of the pump. The condensed fluid then mixes with the oil of the casing 52, the level of which remains constant by virtue of the existing communication with the engine casing 7 through the opposite bearings of the pump shaft 53 and of the crankshaft 6 of the engine 1.

The level of liquid within the engine casing 7 is also maintained under all circumstances by virtue of the admission through the inlet 41 of the liquid elements collected by the separator 3 (FIG. 5). At the moment of starting-up, stopping or changes of engine speed, this arrangement makes it possible to prevent any abnormal reduction in the level of liquid within the casing 7.

Imperviousness of the casing 7 with respect to the surrounding atmosphere is ensured over a long period of time by means of the leak-tight shell 45 which covers the rotary end-seal 47 of the driving-shaft 44 (FIGS. 1 and 4), and comprises a second leak-tight seal 47 which affords high resistance to wear.

In the event of leakage from the casing in an engine which operates automatically without supervision, the invention makes it possible to avoid damage resulting from deficient lubrication since the driving fluid escapes fairly rapidly at the same time as the oil. The engine finally stops of its own accord without any other mechanical incident.

The arrangements mentioned in the foregoing have made it possible to ensure satisfactory lubrication of the engine as hereinabove described and to ensure prolonged operation at different running speeds by means of butane which is vaporized within the evaporator E (FIG. 5) at a mean pressure of approximately 12 bars. Said gaseous fluid was admitted to the engine at a temperature of approximately 67°C and discharged to the condenser C at a temperature of the order of 40°C and at a pressure in the vicinity of 5 bars.

Under the conditions mentioned above, an available power output within the range of 1.5 HP to 3.0 HP has been measured on the driving-shaft 44 in respect of speeds of rotation within the range of 300 to 600 revolutions per minute.

It is readily apparent that the invention is not limited to the embodiment which has been described by way of example and that a number of different alternative forms may be devised without thereby departing either from the scope or the spirit of the invention.

We claim:

1. A piston engine utilizing a liquefiable gaseous fluid having lubricating properties in the liquid state and especially an engine actuated as a result of the expansion of a fluid vaporized under pressure within a system which operates with a low temperature difference, said engine being such as to comprise at least one piston slidably mounted within a cylinder in which is formed a work chamber and a crankshaft associated with the piston by means of a connecting-rod and rotatably mounted within a casing rigidly fixed to the cylinder, said cylinder being provided at least for the flow of the high-pressure fluid with an inlet which can be closed-off by means of a cyclic mechanism controlled by the rotation of the crankshaft, wherein provision is made at least within one of the zones of lubrication of the cylinder and of the cyclic mechanism for a fluid passage and cooling means combined with the said passage so as to cause condensation of the fluid therein.

2. An engine according to claim 1, wherein the means for cooling the cylinder lubrication zone comprise fins projecting from the external surface of the cylinder and extending substantially over the lubrication zone.

3. An engine according to claim 1, wherein the cyclic mechanism which controls the closure of the high-pressure fluid inlet comprises at least one rod mounted within at least one support with a predetermined clearance communicating with a lower-pressure zone for ensuring the flow of fluid between said rod and said support.

4. An engine according to claim 3, wherein the rod has at least one groove located opposite to the support for collecting the condensed fluid.

5. An engine according to claim 3, wherein the support has at least one annular chamber located opposite to the rod for collecting the condensed fluid.

6. An engine according to claim 3, wherein the rod traverses the wall of the work chamber and the wall of the casing through two supports secured to the walls aforesaid in leak-tight manner, said supports being connected to each other by means of a leak-tight jacket which surrounds said rod.

7. An engine according to claim 3, wherein the means for cooling the support lies in the fact that said support is formed of material having a high coefficient of thermal conductivity such as copper, aluminum, nickel, or an alloy of one of the metals aforesaid.

8. An engine according to claim 6, wherein the leak-tight jacket which surrounds the rod is formed of material having a high coefficient of thermal conductivity.

9. An engine according to claim 1, wherein the piston is provided for the flow of the low-pressure fluid with at least one inlet which can be closed-off by means of a reciprocating mechanism controlled by the motion of the connecting-rod with respect to said piston.

10. An engine according to claim 9, wherein the piston has a necked portion forming a junction between two enlarged opposite end portions of the piston, said two end portions being coaxial with the cylinder and adjusted in relation thereto in leak-tight manner, the obturatable inlet of the piston being intended to open into the work chamber and capable of communicating in an obturatable manner with an intermediate chamber constituted by the space formed between the necked portion of the piston and the adjacent wall of the cylinder, said adjacent wall being provided with at least one opening for the flow of the low-pressure fluid.

11. An engine according to claim 9, wherein the piston is formed of material having a high coefficient of thermal conductivity such as copper, aluminum, nickel or one of the alloys of one of the metals aforesaid.

12. An engine according to claim 11, wherein the piston is formed of material having good sliding properties such as lead bronze.

13. An engine according to claim 9, wherein the reciprocating mechanism for controlling the closure of the piston comprises at least one rod mounted within the piston with a predetermined clearance so as to ensure the flow of fluid between said rod and said piston.

14. An engine according to claim 13, wherein the rod of the piston-inlet closure mechanism comprises at least one groove located opposite to the piston for collecting the condensed fluid.

15. An engine according to claim 1, wherein the piston is provided in that portion located opposite to the cylinder with at least one annular sealing ring of hard and greasy plastic material having creep resistance such as PTFE filled with glass fibers, the cylinder being formed of hard material having a very smooth surface such as ground and superfinished cast-iron.

16. An engine according to claim 15, wherein the sealing ring has an elongated rectangular cross-section in the direction of travel of the piston.

17. An engine according to claim 15, wherein the piston has a radial clearance with respect to the cylinder for collecting the condensed fluid on the piston and on the cylinder wall and ensuring lubrication of the piston-ring and the cylinder.

18. An engine according to claim 1 for a system comprising a condenser and an evaporator for the fluid and fluid-circuits for connecting the engine to said condenser and said evaporator, the engine casing being impervious to the surrounding atmosphere and containing an oil which is at least partially miscible with the fluid and serves as lubricant, wherein the casing has an overflow orifice which can be put into communication with the condenser, the height of said orifice within the casing being chosen so as to define therein the upper limit for the level of liquid.

19. An engine according to claim 18 for a system comprising an admission line for connecting the engine to an evaporator and a separator placed in the admission line for collecting the liquid elements entrained by the gaseous fluid derived from the evaporator, wherein the engine casing has an inlet which can be put into communication with the separator so as to convey the liquid elements collected by the separator to said casing.

20. An engine according to claim 18, wherein the casing is provided with a fluid-tight rotary seal for the outlet of at least one end of the crankshaft, said seal being covered by a leak-tight shell fitted with a second fluid-tight rotary seal mounted on the crankshaft at the end remote from the casing with respect to the first seal.

21. An engine according to claim 18 for a system comprising a re-injection pump for introducing the condensed fluid into the evaporator and constituting a mechanical assembly with the engine, wherein the re-injection pump comprises a casing which is impervious to the surrounding atmosphere and communicates with the engine casing.

22. An engine according to claim 21, wherein the re-injection pump integrated with the engine comprises at least one passage between the high-pressure portion and the casing of said engine so as to permit the flow of condensed fluid towards the casing of said re-injection pump.

23. An engine according to claim 22, constituting a mechanical assembly with a re-injection pump comprising at least one piston associated with a cylinder, wherein the passage for the flow of condensed fluid towards the casing of the re-injection pump is constituted by a small clearance between the piston and the cylinder, said piston being additionally provided with a groove for retaining the condensed fluid.

* * * * *